United States Patent
Ettenauer et al.

(10) Patent No.: US 11,821,804 B2
(45) Date of Patent: Nov. 21, 2023

(54) METHOD, DEVICE AND ARRANGEMENT FOR LOAD MEASUREMENT ON A TEST OBJECT

(71) Applicant: Trafag AG, Bubikon (CH)

(72) Inventors: Tobias Ettenauer, Stuttgart (DE); Christoph Schanz, Frickenhausen (DE)

(73) Assignee: Trafag AG, Bubikon (CH)

( * ) Notice: Subject to any disclaimer, the term of this patent is extended or adjusted under 35 U.S.C. 154(b) by 353 days.

(21) Appl. No.: 17/254,754

(22) PCT Filed: Jun. 26, 2019

(86) PCT No.: PCT/EP2019/066930
§ 371 (c)(1),
(2) Date: Dec. 21, 2020

(87) PCT Pub. No.: WO2020/002390
PCT Pub. Date: Jan. 2, 2020

(65) Prior Publication Data
US 2021/0270688 A1    Sep. 2, 2021

(30) Foreign Application Priority Data
Jun. 28, 2018   (DE) ..................... 10 2018 115 713.4

(51) Int. Cl.
*G01L 25/00* (2006.01)
*G01L 1/12* (2006.01)
*G01L 3/10* (2006.01)

(52) U.S. Cl.
CPC ............ *G01L 25/003* (2013.01); *G01L 1/127* (2013.01); *G01L 3/105* (2013.01)

(58) Field of Classification Search
CPC ........ G01L 25/003; G01L 1/127; G01L 3/105
See application file for complete search history.

(56) References Cited

U.S. PATENT DOCUMENTS 3,011,340 A   12/1961   Dahle
3,311,818 A    3/1967   Quittner
(Continued)

FOREIGN PATENT DOCUMENTS

DE              30 31 997 A1    3/1982
DE     10 2013 217 835 A1    3/2015
(Continued)

*Primary Examiner* — Octavia Davis Hollington
(74) *Attorney, Agent, or Firm* — United One Law Group LLC; Kongsik Kim; Jhongwoo Peck (57) ABSTRACT

To reduce a hysteresis error, the invention provides a load measurement method (12) for measuring a load in a test object (14), comprising: a) generating a magnetic field in the test object (14) by means of at least one magnetic field generating coil (Lg) to which a periodically alternating current is applied; b) detecting a magnetic field parameter which changes on the basis of a load in the test object (14), using at least one magnetic field detecting device, in order to generate a magnetic field parameter signal (51) which changes periodically according to the periodically generated magnetic field, characterized by: c) detecting the hysteresis-to-signal ratio of the magnetic field parameter signal (51) over time within one period; and d) disregarding magnetic field parameter signal values from at least one predetermined timespan within each period in which a maximum hysteresis-to-signal ratio occurs.

14 Claims, 7 Drawing Sheets

(56) References Cited

U.S. PATENT DOCUMENTS

| | | | | |
|---|---|---|---|---|
| 3,903,739 | A * | 9/1975 | Kolavcic | G01L 1/127 336/20 |
| 4,135,391 | A | 1/1979 | Dahle | |
| 5,134,368 | A * | 7/1992 | Otaka | G01N 27/72 324/241 |
| 6,516,508 | B1 * | 2/2003 | Gandarillas | G01L 3/105 73/862.336 |
| 7,350,425 | B2 * | 4/2008 | Cripe | G01L 3/105 324/253 |
| 8,222,897 | B2 * | 7/2012 | Sheiretov | G01L 3/102 324/242 |
| 9,435,708 | B1 | 9/2016 | Kari | |
| 2009/0001974 | A1 * | 1/2009 | Sheiretov | G01L 5/164 324/232 |
| 2015/0323397 | A1 * | 11/2015 | May | G01L 3/102 73/779 |
| 2018/0172540 | A1 | 6/2018 | Kari | |
| 2018/0245994 | A1 * | 8/2018 | May | G01L 25/00 |
| 2020/0116579 | A1 * | 4/2020 | Schanz | G01L 1/127 |

FOREIGN PATENT DOCUMENTS

| | | | |
|---|---|---|---|
| DE | 10 2017 104 547 A1 | 9/2018 | |
| EP | 0 384 042 A2 | 8/1990 | |
| EP | 3 051 265 A1 | 8/2016 | |
| JP | 2008519268 A * | 6/2008 | ........... G01R 33/025 |
| WO | 2017/060346 A1 | 4/2017 | |

\* cited by examiner

METHOD, DEVICE AND ARRANGEMENT FOR LOAD MEASUREMENT ON A TEST OBJECT

CROSS-REFERENCES TO RELATED APPLICATIONS

This application is a National Stage Entry of International Application PCT/EP2019/066930 filed on Jun. 26, 2019, which claims priority from German Application 10 2018 115 713.4 filed on Jun. 28, 2018. The aforementioned patent applications are incorporated herein by reference in their entirety.

The invention relates to a load measurement method and a load measurement device as well as a load measurement arrangement for measuring a load in a test object.

In particular, the invention relates to a method and a device for measuring a mechanical load in a test object. Loads are understood to be forces, torques or mechanical stresses in the test object.

Some exemplary embodiments of the invention relate in particular to a torque measuring device for measuring a torque in a test object in the form of a shaft while detecting changes in the magnetic field. Further, embodiments of the invention also relate to a measuring method for measuring a torque by detecting changes in the magnetic field. The torque transducer, the torque sensor and the torque measuring method are particularly designed for detecting changes in the magnetic field based on the Villari effect and even more particularly for magnetoelastic (=inverse magnetorestrictive) torque detection.

Such torque sensors that detect torques in test objects such as shafts in particular, based on magnetic field changes, and the relevant scientific background are described in the following literature:

D1 Gerhard Hinz and Heinz Voigt "Magnetoelastic Sensors" in "Sensors", VCH Verlagsgesellschaft mbH, 1989, Seiten 97-152
D2 U.S. Pat. No. 3,311,818
D3 EP 0 384 042 A2
D4 DE 30 31 997 A
D5 U.S. Pat. No. 3,011,340 A
D6 U.S. Pat. No. 4,135,391 A One type of torque transducers as described in particular in D4 (DE 30 31 997 A1) has proven particularly effective in measuring torques in shafts and at other measuring points.

It is known that magnetic measurement methods can be applied to determine the physical measured values: torque, force and position in ferromagnetic objects. Usually, magnetoelastic (or also inversely magnetorestrictive) sensors or eddy current sensors are used for this purpose. The ferromagnetic materials that are used change their permeability under the influence of tensile or compressive stresses (also called Villari effect). A distinction between the individual effects is usually difficult in practice; only the eddy current sensor is easier to distinguish from the other effects due to its frequency dependence. In addition, the state of magnetization of the object is frequently not known or is strongly influenced by the processing and handling of the objects so that a broad industrial application is often difficult. Moreover, it is often not possible to predict the service life of the magnetized objects in a rather harsh environment in which this technology is used (for example but not exclusively in the field of electromobility, especially E-bikes, e.g. pedelecs, in heavy industry, in gearboxes, in hydraulic systems of construction machinery or in agricultural equipment).

From
D7 EP 3 051 265 A1
it is known to compensate this disadvantage by active magnetization by means of an alternating magnetic field in the kHz range. Generator and detector coils are used for this purpose, namely two first magnetic field detector coils A1, A2 and two second magnetic field detector coils B1, B2 and a central magnetic field generating coil Lg in a cross arrangement (X-arrangement). The difference of the coil pair A−B=(A1+A2)−(B1+B2) is determined in an analog signal processing scheme.

One problem accompanying such measurements by active magnetization is the hysteresis that occurs in the measurement arrangement, which makes it difficult to obtain highly accurate measurements. One method and device for compensating hysteresis are described in D8 WO 2017/060346 A1. For further details concerning the causes of hysteresis and the problems caused by it during load measurement by means of active magnetization, explicit reference is made to D8.

Based on prior art according to D8, it is an object of the present invention to provide methods and devices allowing to further reduce a measurement error caused by hysteresis during load measurement by means of active magnetization.

To solve this object, the invention provides the methods and devices and arrangements according to the independent claims.

Advantageous designs are the subject of the subclaims.

According to one aspect, the invention provides a load measurement method for measuring a load in a test object, comprising:

a) generating a magnetic field in the test object by means of at least one magnetic field generating coil to which a periodically alternating current is applied,
b) detecting a magnetic field parameter which changes on the basis of a load in the test object, using at least one magnetic field detecting device, in order to generate a magnetic field parameter signal which changes periodically according to the periodically generated magnetic field,
c) detecting the hysteresis-to-signal ratio of the magnetic field parameter over time within one period, and
d) disregarding magnetic field parameter signal values from at least one predetermined time span within each period in which a maximum hysteresis-to-signal ratio occurs.

Preferably, the load measurement method further comprises the step:

e) recording magnetic field parameter signal values in at least one predetermined time span within each period in which a smallest hysteresis-to-signal ratio occurs.

It is preferred that step b) comprises detecting the magnetic field parameter signal value at predetermined times within the period.

It is preferred that step c) comprises detecting the hysteresis-to-signal ratio at the predetermined times in order to determine those predetermined times with more or with less hysteresis-to-signal ratio.

It is preferred that step d) comprises disregarding magnetic field parameter signal values at those of the predetermined times per period at which the largest hysteresis-to-signal ratios occur.

It is preferred that step e) comprises the recording of magnetic field parameter signal values at those of the predetermined times per period at which the smallest hysteresis-to-signal ratios occur.

According to an alternative, the invention provides a load measurement method for measuring a load in a test object, in particular according to one of the preceding claims, comprising:
- a) generating a magnetic field in the test object by means of at least one magnetic field generating coil to which a periodically alternating current is applied,
- b) detecting a magnetic field parameter which changes on the basis of a load in the test object, using at least one magnetic field detecting device, in order to generate a magnetic field parameter signal which changes periodically according to the periodically generated magnetic field,
- f) determining a B/H characteristic from the time curve of current and/or voltage at the at least one magnetic field generating coil and the time curve of the magnetic field parameter signal, and
- g) determining at least one measuring signal from the B/H characteristic.

Preferably, a combination of both load measurement methods is provided. In particular, in the method according to the second alternative, regions of the B/H characteristic in which the highest hysteresis-to-signal ratio occurs in the time curve are disregarded.

Preferably, only regions of the B/H characteristic are considered in which the smallest hysteresis-to-signal ratio occurs in the time curve.

It is preferred that step g) comprises:
- g1) determining the relative permeability from a change in the gradient of the B/H characteristic as measuring signal.

It is preferred that step g) comprises:
- g2) determining the change in coercive field strength from the B/H characteristic as measuring signal.

It is preferred that step g) comprises:
- g3) determining the change in remanence from the B/H characteristic as measuring signal.

It is preferred that step g) comprises:
- g4) considering only one or several sub-regions of the B/H characteristic for determining the measuring signal.

It is preferred that step g) comprises:
- g5) determining the gradient of the characteristic at specific points.

According to a further aspect, the invention provides a load measurement device for measuring a load in a test object, comprising a magnetic field generating device for generating a magnetic field in the test object, wherein the magnetic field generating device comprises at least one magnetic field generating coil and a power source for supplying the magnetic field generating coil with a periodically alternating current;
a magnetic field detecting device for detecting a magnetic field parameter which changes on the basis of a load in the test object and for generating a magnetic field parameter signal which periodically changes on the basis of the periodically generated magnetic field; and
an evaluation device for generating a measuring signal from the magnetic field parameter signal,
wherein said evaluation device is configured to obtain information on a hysteresis-to-signal ratio of the magnetic field parameter signal over time within one period, and wherein said evaluation device is configured to disregard magnetic field parameter signal values from at least one predetermined time span within one period in which a maximum hysteresis-to-signal ratio occurs for generating the measuring signal.

It is preferred that a hysteresis-to-signal-ratio detecting device—in particular in the form of an evaluation device—is provided, which detects the hysteresis-to-signal ratio over time within one period.

It is preferred that a hysteresis-to-signal-ratio storage device is provided as a memory in which information on the hysteresis-to-signal ratio over time within one period is stored.

It is preferred that the evaluation device is configured to detect magnetic field parameter signal values in at least one predetermined time span within each period in which a smallest hysteresis-to-signal ratio occurs and to generate the measuring signal from it.

It is preferred that the magnetic field detecting device is configured to detect magnetic field parameter signal values at predetermined times within one period. In particular, a measuring value recording device for the discrete recording of measuring values at predetermined times is provided.

It is preferred that the evaluation device is configured to disregard magnetic field parameter signal values at those of the predetermined times per period at which the largest hysteresis-to-signal ratios occur for generating the measuring signal.

It is preferred that the evaluation device is configured to use magnetic field parameter signal values at those of the predetermined times per period at which the smallest hysteresis-to-signal ratios occur for generating the measuring signal.

According to an alternative, the invention provides a load measurement device comprising:
a magnetic field generating device for generating a magnetic field in the test object, wherein the magnetic field generating device comprises at least one magnetic field generating coil and a power source to supply the magnetic field generating coil with a periodically alternating current;
a magnetic field detecting device for detecting a magnetic field parameter which changes on the basis of a load in the test object and for generating a magnetic field parameter signal which changes periodically according to the periodically generated magnetic field, and
an evaluation device for generating a measuring signal from the magnetic field parameter signal, and
an evaluation device for generating at least one measuring signal from the magnetic field parameter signal,
wherein the evaluation device is configured to determine a B/H characteristic from the time curve of current and/or voltage at the at least one magnetic field generating coil and the time curve of the magnetic field parameter signal and to generate the at least one measuring signal from the B/H characteristic.

Preferably, a load measurement device is provided in which both alternatives of the invention are combined.

It is preferred that the evaluation device is configured to determine the relative permeability from a change in the gradient of the B/H characteristic and to generate a measuring signal from it.

It is preferred that the evaluation device is configured to determine a change in the coercive field strength from the B/H characteristic and to generate a measuring signal from it.

It is preferred that the evaluation device is configured to determine a change in the remanence from the B/H characteristic and to generate a measuring signal from it.

It is preferred that the evaluation device is configured to determine the gradient of the characteristic at predetermined points and to generate a measuring signal from it.

It is preferred that the evaluation device is configured to use only certain sub-regions of the B/H characteristic for generating the measuring signal.

According to a further aspect, the invention relates to a load measurement arrangement comprising a test object and a load measurement device according to one of the preceding embodiments, in particular for the contactless measuring of a load in the test object.

The test object is preferably a test object that can be rotated about an axis of rotation, such as a shaft, a gear wheel, a toothed wheel or the like. As an alternative, the test object can be a stationary element, such as strut, a support, a pull or push rod or a membrane, e.g. of a pressure sensor.

In preferred embodiments of the invention, the hysteresis compensation is based on that only sections of a measuring period (e.g. of a rectangle or a sine) are considered in calculating the measuring signal.

In an alternative or additional embodiment, for example, in addition to an induction voltage in secondary coils, the current consumption in the primary coils for example is also recorded—from this information it is possible to calculate a complete B/H characteristic of the load measurement arrangement that includes the load measuring device and the test object, i.e. a torque sensor and a measuring material, for example.

B is the magnetic flux density, also known as magnetic induction. More precisely, this is the surface density of the magnetic flux that passes vertically through a particular surface element. H is the magnetic field strength (also called magnetic excitation) which as a vector quantity equips every space with an order. A strength and direction of the magnetic field generated by the magnetic tension to. The magnetic flux density and the magnetic field strength are related via the material equations of electrodynamics $B=\mu H$.

It is also possible to consider this B/H characteristic "only" partially for extracting the measuring signal.

There are various ways to calculate a reasonable measuring signal from this measurement curve, for example, a change in the gradient of the curve or a change in the coercive field strength or the remanence.

In particular, the invention relates to hysteresis compensation by vector decomposition.

Specific embodiments of the invention relate to hysteresis compensation by means of a phase-amplitude relationship.

In some materials, such as especially non-hardened soft steels, active load measuring, e.g. torque measuring, shows very large hysteresis curves. One way to compensate hysteresis is the idea of using different intensities of a generator voltage, as described in more detail in D8.

Embodiments of the invention make use of an additional option for hysteresis compensation, in which a periodical magnetic field parameter signal is subdivided into different phases and these phases are evaluated individually.

For example, an AC signal from secondary coils (i.e. measuring coils of the magnetic field detecting device) which is generated when an alternating field is applied by a primary coil (coil of a magnetic field generating device) is subdivided into individual phases per period, and these are evaluated individually.

Preferably, an alternating field (sine, rectangle, saw tooth, . . . ) is used as an excitation source for the primary inductance. The voltage induced in the secondary coils follows the excitation source with a phase shift. The relationship of the primary coil and the secondary coil can also be understood as B/H characteristic.

In one embodiment, signal processing is configured in such a way that the characteristic of the secondary coils is sampled using several support points (which may vary depending on the excitation frequency). These support points represent the characteristic curve of the secondary voltage.

When considered individually, the different sections of the secondary curve show a different effect concerning sensitivity, offset and hysteresis behavior. This means there are sections in the secondary measuring curve which have a clearly smaller hysteresis-signal ratio when viewed individually.

One idea on which the preferred embodiments of the invention are based relates to that only specific support points (vectors) of the read-in primary voltage curve are used for evaluation in signal processing.

These are preferably selected in such a way that the hysteresis is minimized.

An extension of or alternative to this method is the possibility of recording the current consumption of the primary side (correlated with the H-field) over time in addition to direct recording of the secondary side (analogous to the B-field) and thus calculating a unique B/H characteristic.

This B/H characteristic can be used to calculate the relative permeability in various segments or sections of the measuring curve. The direct calculation of the relative permeability constitutes a measured quantity which is less influenced concerning hysteresis behavior and other measuring effects.

Embodiments of the invention will be described in more detail below with reference to the attached drawings wherein it is shown by.

In the FIGS. 1 to 5, various embodiments of sensor heads 10 for a load measurement device 12 are shown. The load measurement device 12 serves for measuring loads, such as especially torques, forces or tensions, in an at least partially magnetizable test object 14, such as a shaft, a transmission part, a wheel hub, a chain wheel or the like, which can rotate about a rotation axis. In other designs, the test object 14 can also be stationary, such as a support or a strut in a support structure where loads or forces must be measured. In a different design, the test object can be a membrane of a pressure sensor as further described in German patent application 10 2017 104 547.3 to which reference is explicitly made for further details. The test object 14 is at least partially formed from a ferromagnetic material, at least in a measuring region. The test object 14 and the load measurement device 12 together form a load measurement arrangement 16.

The load measurement device 12 comprises a magnetic field generating device 18 and several magnetic field detecting devices 20, 22.

The load measurement device additionally comprises an evaluation device 42. The evaluation device 42 is coupled to the magnetic field detecting devices 20, 22. The evaluation device 42 is particularly designed for compensating hysteresis effects, which will be described in more detail below. For this purpose, the evaluation device 42 comprises a measuring value recording device 44 for recording measuring values at predetermined times of a measuring period, an evaluating means 46 for evaluating the measuring values recorded at different times of a measuring period, and a memory 48 for storing information on the evaluation.

The magnetic field generating device 18 includes a magnetic field generating coil Lg and a driver circuit 50 for driving the magnetic field generating coil Lg. The driver circuit 50 supplies the magnetic field generating coil Lg (also referred to as primary coil) with a periodically alternating current, e.g. with a rectangular current, sinusoidal current, sawtooth current or the like, having a predetermined frequency f and thus a predetermined period $T=1/f$. The frequency is, for example, within a range of 1 kHz to 200 kHz.

The magnetic field detecting devices 20, 22, include magnetic field sensors 26 in the form of detector coils A1, A2, B1, B2 (also referred to as measuring coils or secondary coils) or in the form of solid state magnetic field sensors 27, and the evaluation device 42 for evaluating the signals from the magnetic field sensors 26.

Figure 1:
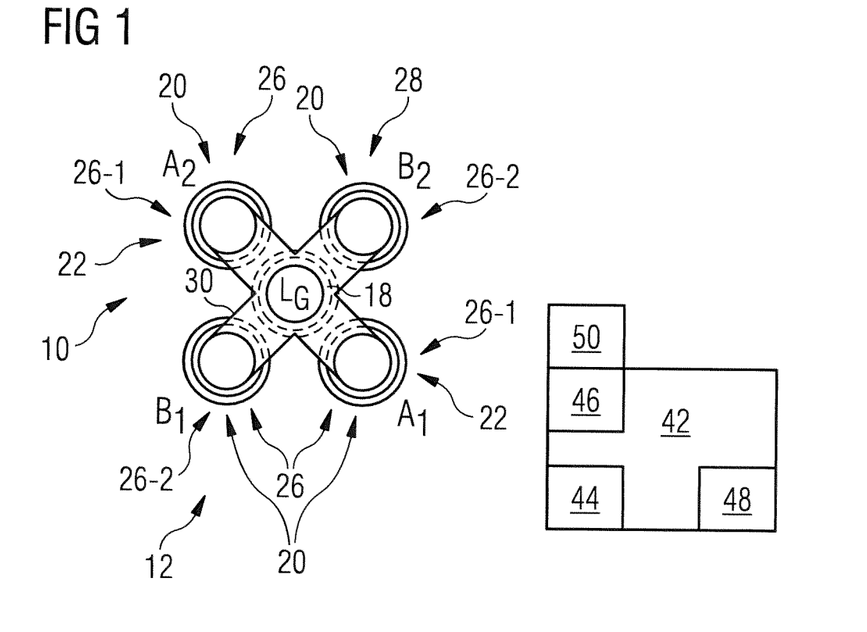
FIG. 1 a first preferred embodiment of a sensor head of a load measurement device for measuring a mechanical load, such as especially force, tension or torque in a test object.
Figure 3:
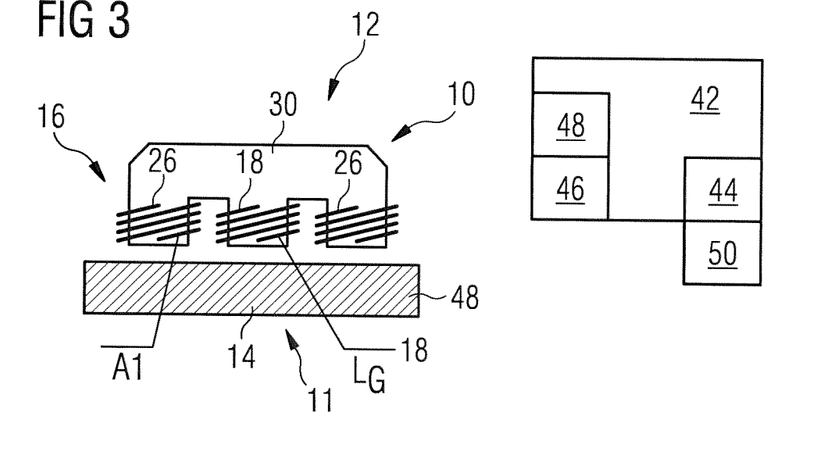
FIG. 3 a lateral view of the sensor head of FIG. 1 along with the test object.

The embodiment shown in FIG. 1, looking at the front side of the sensor head 10 to be directed to the test object 14, is shown from the side in FIG. 3. This embodiment comprises two first magnetic field sensors 26-1 configured as first detector coils A1, A2 and two second magnetic field sensors 26-2 configured as second detector coils B1, B2. The detector coils A1, A2, B1, B2 are provided in a cross arrangement or X-arrangement 28 on a common flux concentrator 30 from ferromagnetic material. In this case, the magnetic field generating coil Lg is arranged in the center—here also on a corresponding projection of the flux concentrator 30—with the first detector coils A1 and A2 being opposite each other and the second detector coils B1 and B2 being opposite each other.

Figure 2:
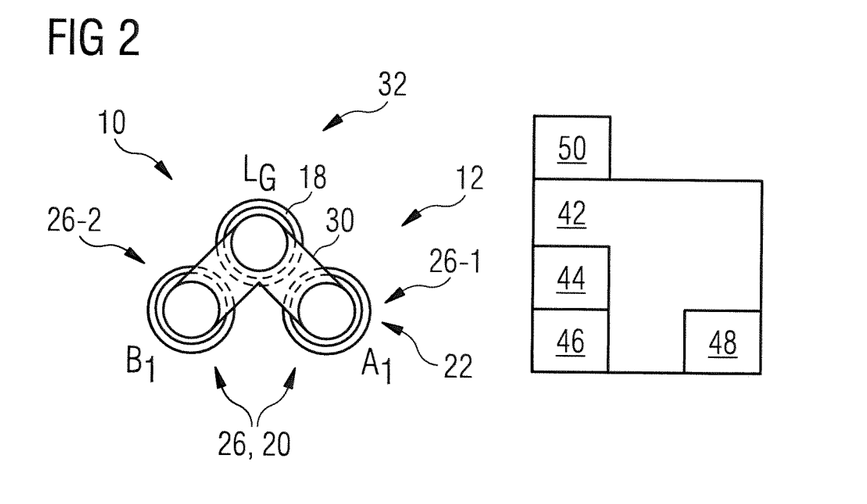
FIG. 2 a second preferred embodiment of the sensor head.

FIG. 2 shows another embodiment of the sensor head 10 in a V-arrangement 32 where only one first magnetic field sensor 26-1—e.g. the first detector coil A1—and only one second magnetic field sensor 26-1 are arranged at an angle to each other, with the magnetic field generating coil Lg at the tip of the angle shape.

Figure 4:
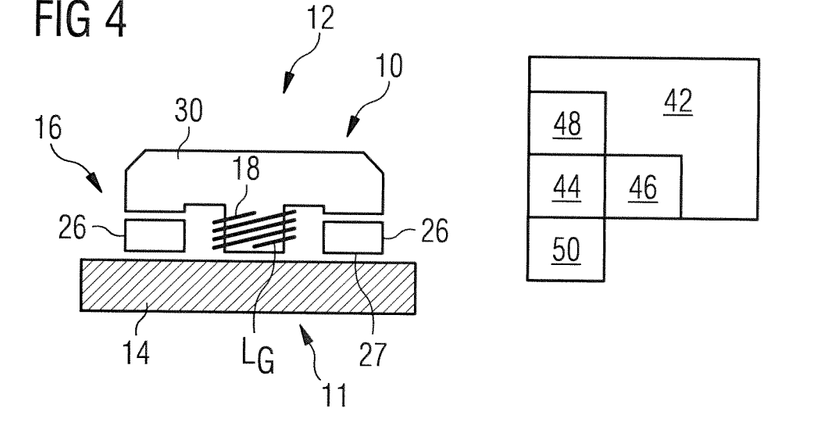
FIG. 4 a view similar to FIG. 3 of another embodiment of the sensor head.

As shown in FIG. 4, the detector coils can also be replaced by solid state magnetic field sensors 27 as first and second magnetic field sensors 26-1, 26-2.

Figure 5:
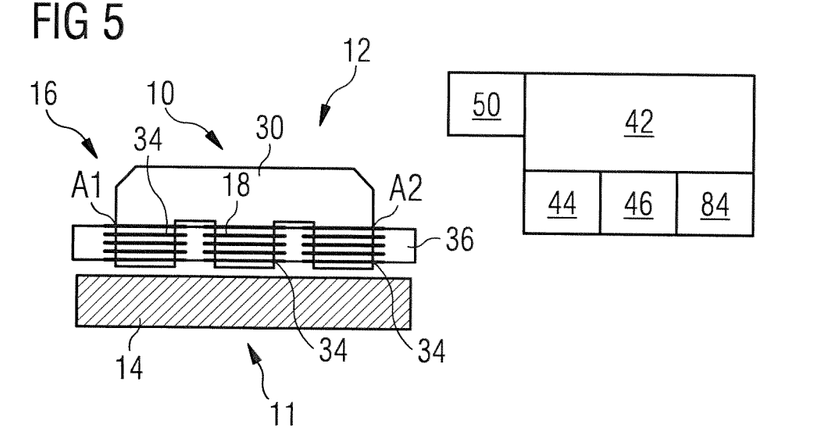
FIG. 5 a view similar to FIG. 3 of still another embodiment of the sensor head.

FIG. 5 shows one embodiment of the sensor head 10 in which the coils—detector coils A1, A2, B1, B2 and the magnetic field generating coil Lg—are provided as planar coils 34 in a circuit board element 36—designed as PCB boards for instance.

As described in the different literature D1-D7, the magnetic field sensors 26-1, 26-2 deliver a magnetic field parameter signal that depends on the load in the test object. For example, in the X-arrangement 28, the magnetic field parameter signal among the signals from the detector coils A1, A2, B1 and B2 is processed as described in D7 in order to determine the difference of the coil pair A-B as a magnetic field parameter signal.

The magnetic field parameter signal follows the periodical change in the excitation current applied to the magnetic field generating coil Lg with a phase shift.

Figure 6:
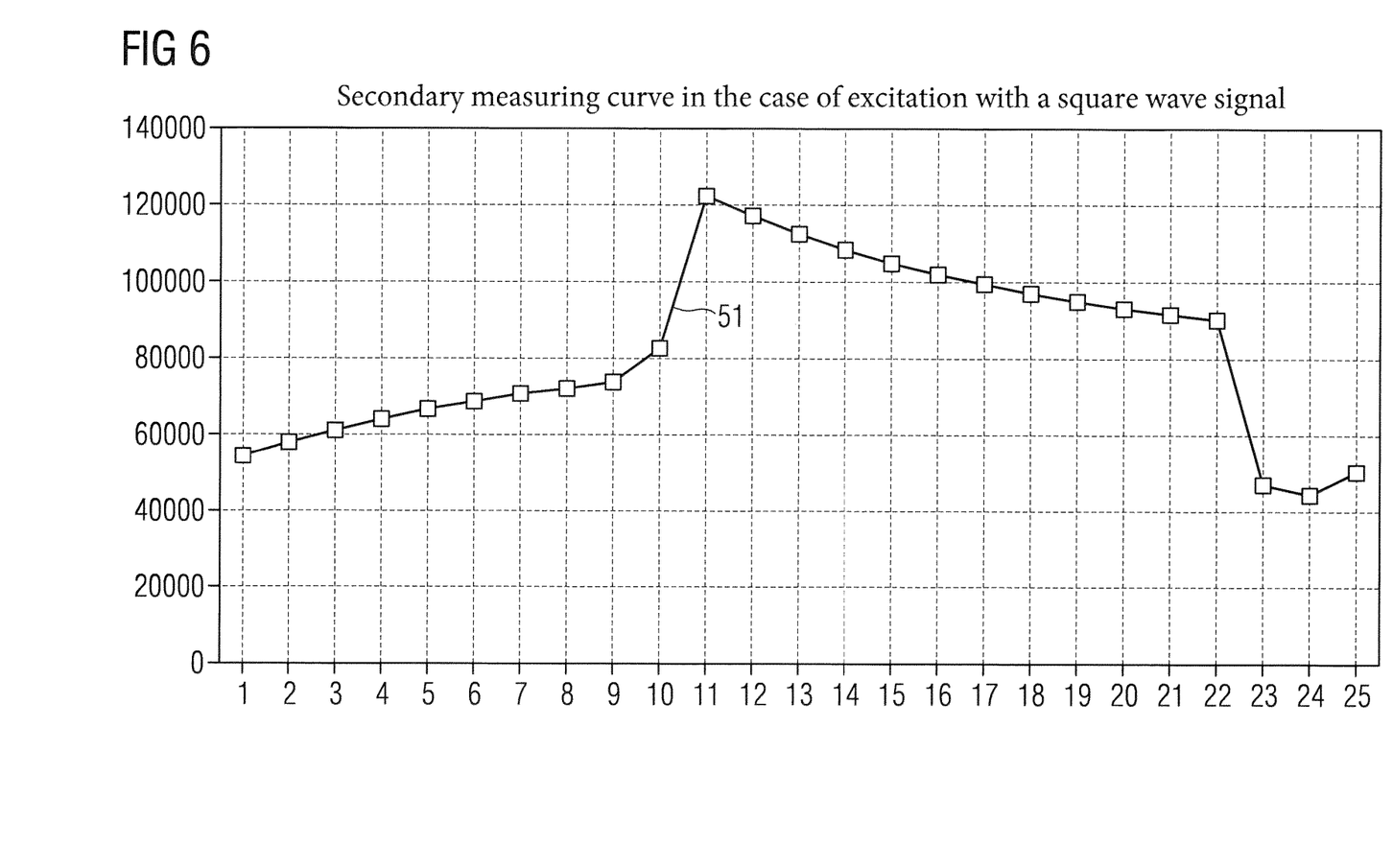
FIG. 6 a graph for a waveform of a magnetic field parameter signal measured by means of a magnetic field detecting device of one of the sensor heads of the FIGS. 1 to 5 during excitation of a magnetic field generating device of the sensor head by a square wave, wherein different support points (measuring times) are shown.

FIG. 6 shows one example of a magnetic field parameter signal that is produced by the magnetic field sensors 26-1, 26-2 when a rectangular current is applied to the magnetic field generating coil Lg. The output of the magnetic field sensors 26-1, 26-2 is connected to the evaluation device 42. This comprises an analog-digital converter (not shown), which is part of the measuring value recording device 44. The measuring value recording device 44 records the respective magnetic field parameter signal value for different support points (vectors) that are shown by numbers on the x axis of FIG. 6. FIG. 6 represents one period of the secondary measuring curve—magnetic field parameter signal—in case of excitation with a square wave signal on the primary side. The magnetic field parameter signal shown here on the secondary side follows the excitation on the primary side with a phase shift, i.e. with a corresponding period as on the primary side. In this case, this period is sampled with 25 support points. Each support point is located at a predetermined point in time within the period.

In the evaluating means 46, each of these support points is evaluated for its suitability for accurate measurement of loads.

For example, after an initial installation of the load measurement arrangement 16 or after an initial or repeated start of the load measurement device 12, a calibration or learning process can be carried out in which an evaluation of each of these support points is performed.

In this process, the test object 14 is subject to a predetermined load. In the example shown in more detail below, for this purpose, the test object is subject to a linearly increasing load and to a corresponding linearly decreasing load and is read out several times corresponding to FIG. 6 during the increase or decrease of the magnetic field parameter signal, and each support point 1 to 25 is evaluated.

For example, a torque is measured in a shaft as a test object 14. To this end, a uniformly linearly increasing torque is first applied to the shaft as the test object 14 up to a maximum value in one direction and is then uniformly decreased again; thereafter an increasing torque is applied in the other direction also up to a maximum value and is then decreased again to zero.

Figure 7:
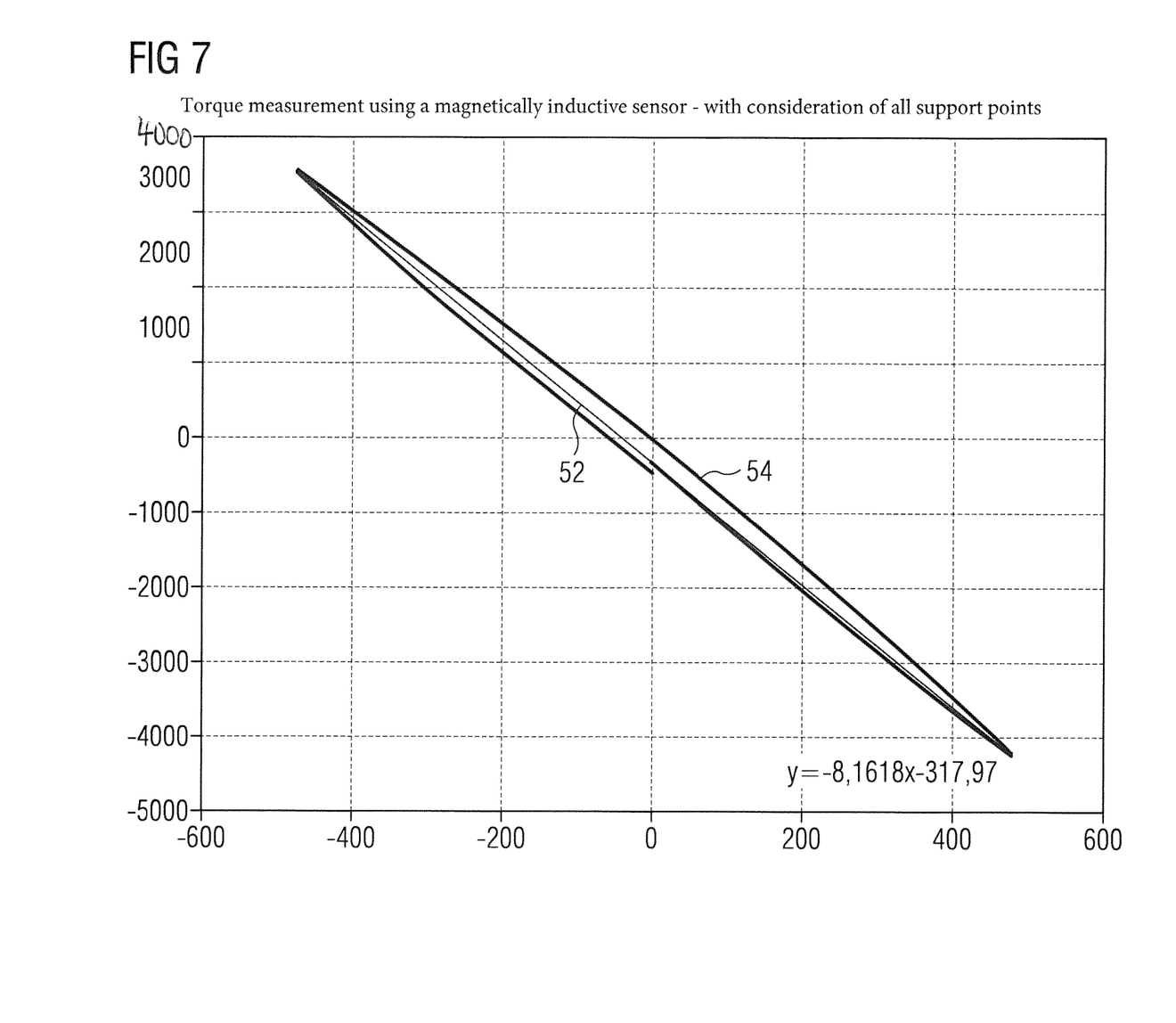
FIG. 7 a graph of a measuring signal of a torque measurement using a magnetically inductive sensor head of the type shown in the FIGS. 1 to 5 when considering all support points from FIG. 6.

The x-axis in FIG. 7 shows the applied torque and the y-axis shows the measuring signal. The ideal measuring curve is indicated at pos. 52, and the real measuring curve is indicated at pos. 54. Because of the hysteresis, the real measuring curve 54 deviates from the ideal measuring curve 52.

Figure 8:
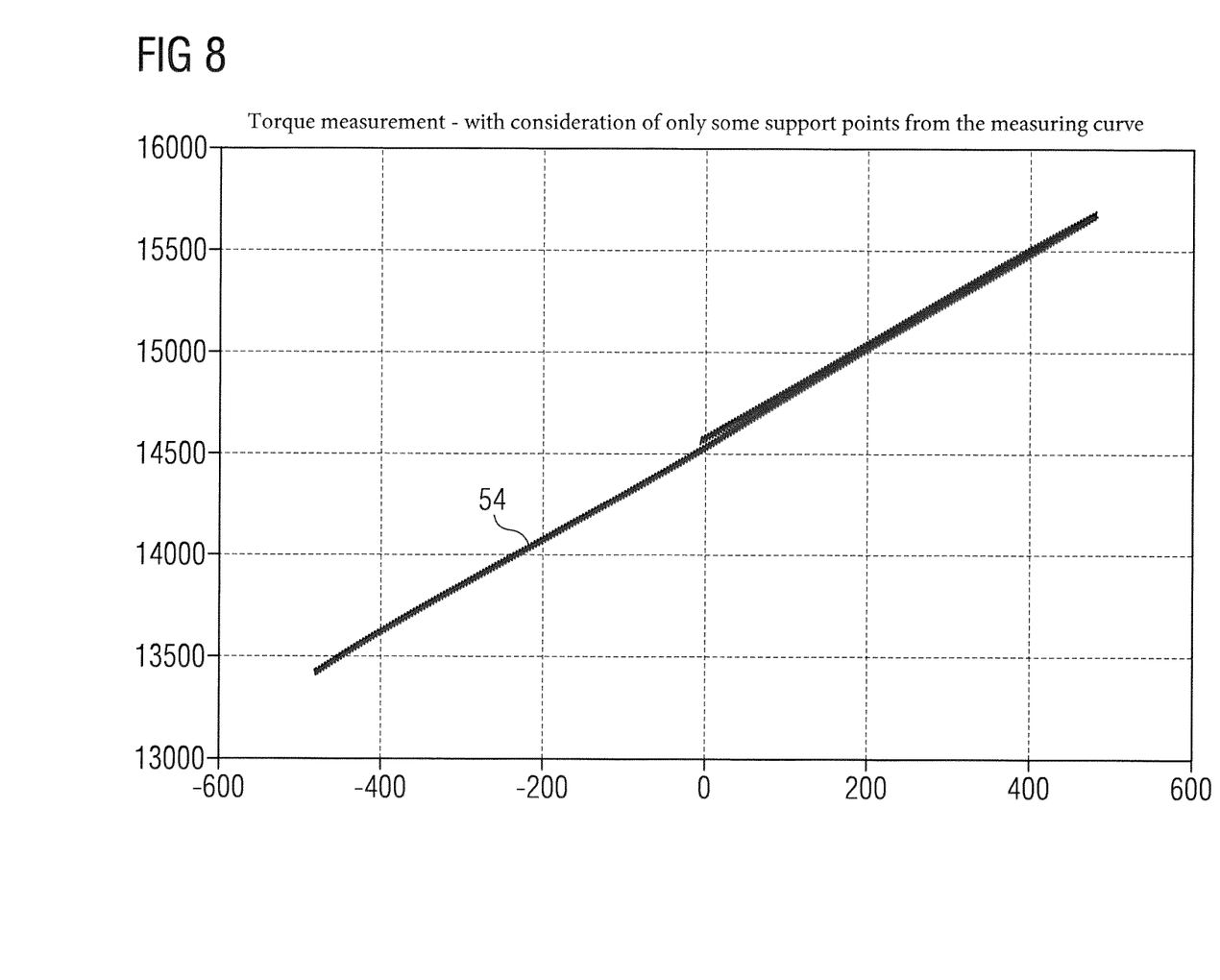
FIG. 8 a graph similar to FIG. 7, wherein only some support points from the measuring curve of FIG. 6 have been considered.

On the other hand, FIG. 8 shows a corresponding curve similar to FIG. 7. In this curve, however, not all but only some support points from the secondary measurement curve shown in FIG. 6 were considered. It can be seen in FIG. 8 that a significant reduction of the hysteresis error can be achieved.

FIG. 6 accordingly shows the wave form on the secondary side with 25 support points that were captured by the analog-digital converter on the primary side when a rectangular signal was used for excitation.

The FIGS. 7 and 8 show two measuring curves, both of which have been extracted from the same data set. FIG. 7 shows a measuring curve in which all 25 support points were used for calculation. On the other hand, in the measuring curve of FIG. 8, only certain support points were considered. It can be seen that a reduction of hysteresis from about 6% in FIG. 7 to less than 0.5% in FIG. 8 can be achieved.

Figure 9:
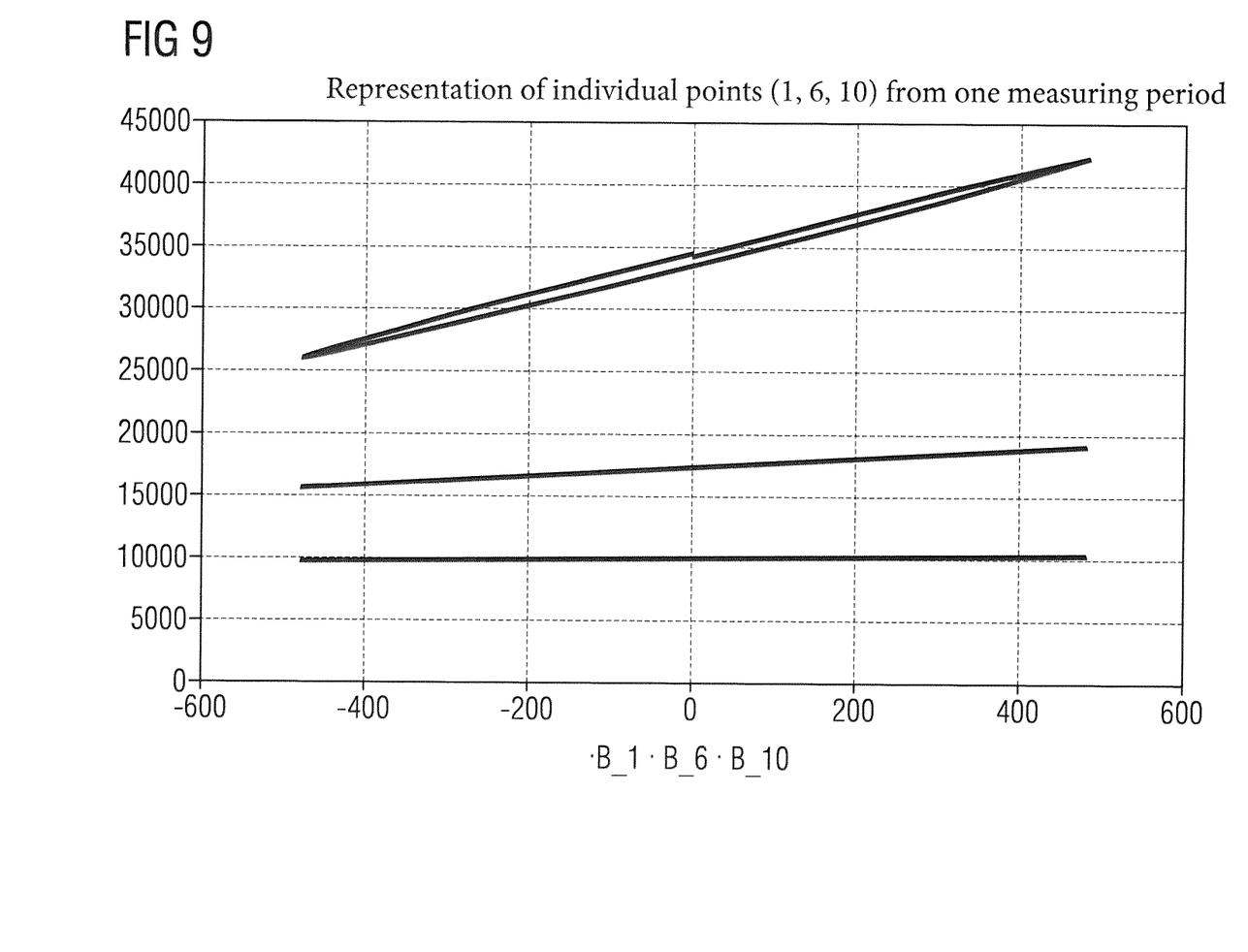
FIG. 9 a comparison of a measurement of a linear torque increase, wherein the measurement is shown only at the measuring points 1, 6 and 10 from the measuring period of FIG. 6.

In the following, FIG. 9 is used to explain the way in which support points are determined that are to be considered for the measuring curve. FIG. 9 is an exemplary representation of the way in which the exemplary support points 1, 6 and 10 of the 26 support points of a secondary period behave over a linearly changing torque load. The different support points 1, 6 and 10 have a different sensitivity, but also have different hystereses, a different temperature behavior, behavior on RRN and other measuring effects.

By applying an appropriate calibration load with linear torque increase and torque decrease and evaluating the data sets obtained at each of the support points, the evaluating means 46 determines the hysteresis-to-signal ratio for each of the support points. The corresponding information can be stored in the memory.

In subsequent measurements, only those support points with the best, i.e. the smallest hysteresis-to-signal ratio are considered by the evaluation device 42. The measuring values of support points with the highest hysteresis-to-signal ratio are disregarded for obtaining the measuring signal.

For example, if the learning process reveals that the support points 4-9 and 12-16 have the smallest hysteresis-to-signal ratio, subsequent measurements by the measuring value recording device 44 will only collect measuring values at these support points 4 through 9 and 12 through 16. Those time spans of the period which are outside the time spans including the support points which are considered, remain unconsidered, i.e. no measuring values are recorded at all at these support points.

It is thus possible to achieve the measuring curve shown in FIG. 8, in which the hysteresis error is significantly reduced. Overall, a measurement with a significantly reduced hysteresis error can be achieved in this way.

In the embodiments shown in the FIGS. 6 to 9, only the magnetic field parameter signals from the magnetic field sensors 26-1, 26-2 have been considered.

However, it is also possible to consider parameters at the magnetic field generating device 18, such as the current applied to the magnetic field generating coil Lg. In this way a B/H characteristic can be obtained from which measuring signals can also be generated.

Figure 10:
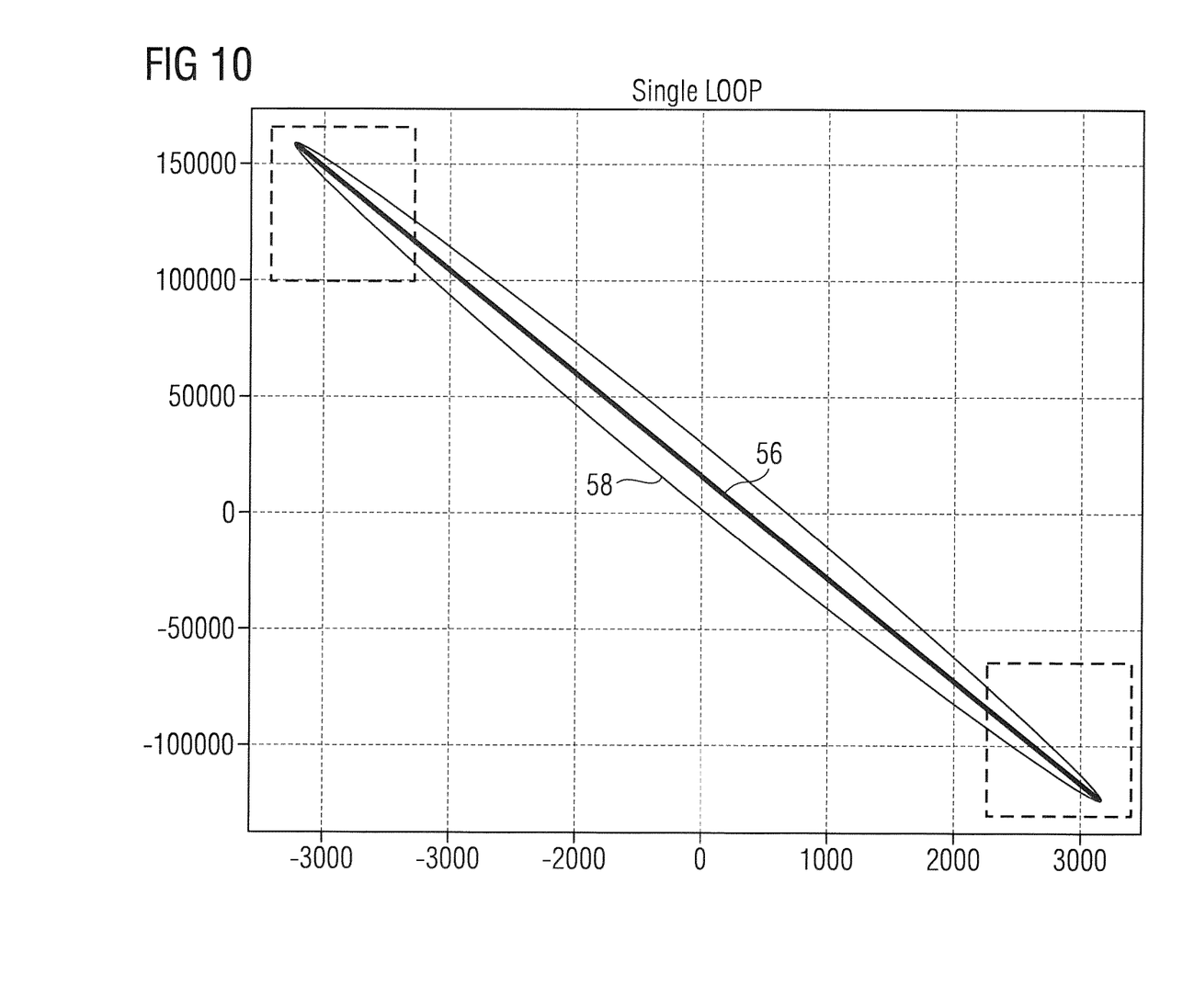
FIG. 10 a graph of a B/H characteristic obtained from a direct detection of a magnetic field parameter signal from the magnetic field detecting device and a current consumption of the magnetic field generating device over time and the subsequent computation.

FIG. 10 shows a typical B/H characteristic obtained with a primary coil—magnetic field generating coil Lg—and a secondary coil—for instance one of the detector coils A1, A2, B1 and B2. An alternating field has been used for excitation of the primary coil. For the secondary coil, the current consumption was measured via a shunt.

In the embodiments of the FIGS. 6 to 9, only the B-share—for instance the induction voltage in the secondary side—was used. On the other hand, when B and H are measured at the same time, the characteristic curve shown in FIG. 10 can be calculated, and from this characteristic curve a measuring signal can be calculated which behaves linearly to the torque.

As can be seen in FIG. 10, the hysteresis in the B/H characteristic is particularly high in a central part of the graph of FIG. 10.

Analogous to the above-described procedure, in which only some support points from the measuring curve of FIG. 6 were used for generating the measuring signal, it is also possible to consider only a part of this characteristic curve when the B/H characteristic is used.

For example, only the outlined areas of the B/H characteristic of FIG. 10 are used for generating the measuring signal.

For example, one or more of the following measuring signals can be generated from the B/H characteristic:
- e.g. the change in the gradient of the characteristic dB/dH for calculating the relative permeability
- the change in the coercive field strength—$H_c$
- the change in remanence—$M_r$
- the gradient of the characteristic at predetermined points
- the generation of a measuring signal under consideration of dedicated areas, for instance the outlined areas in FIG. 10

In FIG. 10, the curve of the magnetic field strength H is plotted at pos. 56. This corresponds to the current consumption of the magnetic field generating coil Lg. At pos. 58, the magnetic flux density B is plotted which can be obtained via the current consumption at one of the detector coils A1, A2, B1 and B2. To record the characteristic curve of FIG. 10, the current of the magnetic field generating coil Lg can, for example, be increased and decreased by the driver circuit 50 in a linearly increasing and linearly decreasing manner and then, on the one hand, when increasing and, on the other hand, when decreasing, the corresponding value B on the secondary side can be assigned to each value H on the primary side. This can also be done over the measurement periods with corresponding excitation with the frequency f.

LIST OF REFERENCE SIGNS

10 sensor head
11 measuring region
12 load measurement device
14 test object
16 load measurement arrangement
18 magnetic field generating device
20 first magnetic field detecting device
22 second magnetic field detecting device
26 magnetic field sensor
26-1 first magnetic field sensor
26-2 second magnetic field sensor
27 solid state magnetic field sensor
28 X-arrangement
30 flux concentrator
32 V-arrangement
34 planar coil
36 circuit board element
42 evaluation device
44 measuring value recording device
46 evaluating means
48 memory
50 driver circuit
51 magnetic field parameter signal
52 ideal measuring curve
54 real measuring curve 56 magnetic field strength H
58 magnetic flux density B
A1 first detector coil
A2 second detector coil
B1 third detector coil
B2 fourth detector coil
Lg magnetic field generating coil

The invention claimed is:

1. A load measurement method for measuring a load in a test object, comprising:
   a) generating a magnetic field in the test object by means of at least one magnetic field generating coil (Lg) to which a periodically alternating current is applied;
   b) detecting a magnetic field parameter which changes on the basis of a load in the test object, using at least one magnetic field detecting device, in order to generate a magnetic field parameter signal which changes periodically according to the magnetic field;
   c) detecting a hysteresis-to-signal ratio of the magnetic field parameter signal over time within one period;
   d) disregarding values in the magnetic field parameter signal from at least one predetermined time span within each period in which a maximum hysteresis-to-signal ratio occurs; and
      determining the load in the test object based on the magnetic field parameter signal with the values in which the maximum hysteresis-to-signal ratio occurs excluded.

2. The load measurement method according to claim 1, characterized by:
   e) recording magnetic field parameter signal values in at least one predetermined time span within each period in which a minimum hysteresis-to-signal ratio occurs.

3. The load measurement method according to claim 1, characterized in that
   step b) comprises capturing values of the magnetic field parameter signal at predetermined times within the period,
   step c) comprises detecting the hysteresis-to-signal ratio at the predetermined times to determine those predetermined times with more or with less hysteresis-to-signal ratio, and
   step d) comprises disregarding values in the magnetic field parameter signal at those of the predetermined times per period at which the maximum hysteresis-to-signal ratios occur.

4. The load measurement method according to claim 2, characterized in that
   step e) comprises recording values in the magnetic field parameter signal at those of the predetermined times per period in which the minimum hysteresis-to-signal ratios occur.

5. The load measurement method according to claim 1, further characterized by:
   f) determining a B/H characteristic from a time curve of current and/or voltage at the at least one magnetic field generating coil (Lg) and a time curve of the magnetic field parameter signal (Lg), and
   g) determining at least one measuring signal from the B/H characteristic.

6. The load measurement method according to claim 5, characterized in that
   step g) comprises at least one or more of the following steps:
   g1) determining a relative permeability from a change in gradient of the B/H characteristic as the measuring signal;
   g2) determining a change in coercive field strength from the B/H characteristic as the measuring signal;
   g3) determining a change in remanence from the B/H characteristic as the measuring signal;
   g4) considering one or more sub-regions of the B/H characteristic for determining the measuring signal; or
   g5) determining the gradient of the B/H characteristic at particular points.

7. A load measurement device for measuring a load in a test object, comprising:
   a magnetic field generating device for generating a magnetic field in the test object, the magnetic field generating device comprising at least one magnetic field generating coil (Lg) and a current source for supplying the magnetic field generating coil (Lg) with a periodically alternating current;
   a magnetic field detecting device for detecting a magnetic field parameter in the test object which changes on the basis of a load in the test object and for generating a magnetic field parameter signal which changes periodically according to the magnetic field; and
   an evaluation device for generating a measuring signal from the magnetic field parameter signal,
   characterized in that the evaluation device is configured to:
   obtain information on a hysteresis-to-signal ratio of the magnetic field parameter signal over time within one period;
   disregard values in the magnetic field parameter signal from at least one predetermined time span within each period in which a maximum hysteresis-to-signal ratio occurs; and
   determine the load in the test object based on the magnetic field parameter signal with the values in which the maximum hysteresis-to-signal ratio occurs excluded.

8. The load measurement device according to claim 7, characterized in that an evaluating means is provided which records the hysteresis-to-signal ratio of the magnetic field parameter signal over time within one period; and/or
   a memory is provided in which information on the hysteresis-to-signal ratio over time within one period is stored.

9. The load measurement device according to claim 7, characterized in that
   the evaluation device is configured to capture magnetic field parameter signal values in at least one time span within each period in which a minimum hysteresis-to-signal ratio occurs and to generate a measuring signal from it.

10. The load measurement device according to claim 7, characterized in that
    the magnetic field detecting device is configured to capture magnetic field parameter signal values at predetermined times within one period, and
    the evaluation device is configured to disregard magnetic field parameter signal values at those of the predetermined times per period at which the maximum hysteresis-to-signal ratios occur for the generation of the measuring signal.

11. The load measurement device according to claim 10, characterized in that
    the evaluation device is configured to use values in the magnetic field parameter signal at those of the predetermined times per period at which a minimum hysteresis-to-signal ratios occur for the generation of the measuring signal.

12. The load measurement device according to claim 7, characterized in that
the evaluation device is configured to determine a B/H characteristic from a time curve of the current and/or voltage at the at least one magnetic field generating coil (Lg) and the time curve of the magnetic field parameter signal and to generate the at least one measuring signal from the B/H characteristic.

13. The load measurement device according to claim 12, characterized in that the evaluation device is configured to:
- 13.1 determine a relative permeability from a change in gradient of the B/H characteristic and to generate the measuring signal from it, and/or
- 13.2 determine a change in coercive field strength from the B/H characteristic and to generate the measuring signal from it, and/or
- 13.3 determine a change in remanence from the B/H characteristic and to generate the measuring signal from it, and/or
- 13.4 determine the gradient of the B/H characteristic at predetermined points and to generate the measuring signal from it and/or
- 13.5 use only certain sub-regions of the B/H characteristic for the generation of the measuring signal.

14. A load measurement arrangement, comprising a test object and the load measurement device according to claim 7 for contactless load measurement in the test object.

* * * * *